US010981300B2

(12) United States Patent
Gray

(10) Patent No.: US 10,981,300 B2
(45) Date of Patent: Apr. 20, 2021

(54) INDUCTION HEATING SYSTEM FOR MOLDING A THERMOPLASTIC ARTICLE AND METHOD FOR MOLDING A THERMOPLASTIC ARTICLE

(71) Applicant: The Boeing Company, Chicago, IL (US)

(72) Inventor: Everette D. Gray, Seattle, WA (US)

(73) Assignee: The Boeing Company, Chicago, IL (US)

( * ) Notice: Subject to any disclaimer, the term of this patent is extended or adjusted under 35 U.S.C. 154(b) by 181 days.

(21) Appl. No.: 16/217,276

(22) Filed: Dec. 12, 2018

(65) Prior Publication Data

US 2020/0189148 A1    Jun. 18, 2020

(51) Int. Cl.

| B29C 33/06 | (2006.01) |
| H05B 6/06 | (2006.01) |
| H05B 6/10 | (2006.01) |
| H05B 6/42 | (2006.01) |
| H05B 6/38 | (2006.01) |
| H05B 6/44 | (2006.01) |
| B29C 35/08 | (2006.01) |

(52) U.S. Cl.
CPC ............ *B29C 33/06* (2013.01); *H05B 6/06* (2013.01); *H05B 6/105* (2013.01); *H05B 6/38* (2013.01); *H05B 6/42* (2013.01); *H05B 6/44* (2013.01); *B29C 2035/0811* (2013.01); *H05B 2206/022* (2013.01)

(58) Field of Classification Search
None
See application file for complete search history.

(56) References Cited

U.S. PATENT DOCUMENTS

| 6,455,825 B1 * | 9/2002 | Bentley ................. G05D 23/26 |
| | | 148/567 |
| 6,566,635 B1 | 5/2003 | Matsen et al. |
| 8,375,758 B1 | 2/2013 | Matsen et al. |
| 8,383,998 B1 | 2/2013 | Matsen et al. |
| 9,259,886 B2 | 2/2016 | Matsen et al. |
| 9,586,362 B2 | 3/2017 | Matsen et al. |
| 9,635,714 B2 | 4/2017 | Matsen et al. |
| 9,820,339 B2 | 11/2017 | Matsen et al. |
| 2007/0267405 A1 * | 11/2007 | Feigen-Blum ......... H05B 6/105 |
| | | 219/601 |

(Continued)

FOREIGN PATENT DOCUMENTS

WO     WO-0018190 A2 *  3/2000  ............. B22D 41/60

OTHER PUBLICATIONS

Translation of WO 00/18190 (Year: 2000).*

(Continued)

*Primary Examiner* — Marc C Howell
*Assistant Examiner* — John J Derusso
(74) *Attorney, Agent, or Firm* — Walters & Wasylyna LLC

(57) ABSTRACT

An induction heating system for molding a thermoplastic article includes a first mold and a second mold defining a mold cavity therebetween for molding the thermoplastic article, a first metallic susceptor as part of or adjacent to the first mold, a first armature-supported induction coil array in proximity to the first metallic susceptor, and a first induction generator electrically coupled with the first armature-supported induction coil array.

24 Claims, 10 Drawing Sheets

(56) References Cited

U.S. PATENT DOCUMENTS

2008/0303194 A1    12/2008  Anbarasu et al.
2012/0292826 A1*   11/2012  Ueha ...................... B29C 45/73
                                                            264/403

OTHER PUBLICATIONS

European Patent Office, Extended European Search Report, App. No. 19210031.1 (dated Aug. 3, 2020).
European Patent Office, Partial European Search Report, App. No. 19210031.1 (dated Apr. 30, 2020).

* cited by examiner

INDUCTION HEATING SYSTEM FOR MOLDING A THERMOPLASTIC ARTICLE AND METHOD FOR MOLDING A THERMOPLASTIC ARTICLE

FIELD

The present application relates to the field of molding of thermoplastic articles, particularly molding of thermoplastic articles using induction heating.

BACKGROUND

Methods that enable rapid fabrication of molded thermoplastic articles may be desirable in some applications. Conventional thermoplastic fabrication includes autoclave processing with resistive heating. Rapid fabrication using conventional fabrication may be challenging.

Another method uses induction heating of tool interfaces with integral water cooling of the induction coils within the tooling. However, integral water cooling may be challenging, particularly when molding thermoplastic articles requiring high temperatures and high pressures.

Accordingly, those skilled in the art continue with research and development in the field of molding of thermoplastic articles.

SUMMARY

In one embodiment, an induction heating system for molding a thermoplastic article includes a first mold and a second mold defining a mold cavity therebetween for molding the thermoplastic article, a first metallic susceptor as part of or adjacent to the first mold, a first armature-supported induction coil array in proximity to the first metallic susceptor, and a first induction generator electrically coupled with the first armature-supported induction coil array.

In another embodiment, a method for molding a thermoplastic article includes positioning a thermoplastic article between a first mold including a first metallic susceptor and a second mold including a second metallic susceptor, inductively heating the first metallic susceptor using a first induction frequency, detecting a magnetic hysteresis from the inductively heated first metallic susceptor, adjusting the first induction frequency based on the magnetic hysteresis from the inductively heated first metallic susceptor, and pressing together the first mold and the second mold.

In another embodiment, a method for processing a thermoplastic article includes generating heat by frequency matching induction generation using a modular induction coil and air cooling the modular induction coil.

Other embodiments of the disclosed induction heating system and method for molding a thermoplastic article will become apparent from the following detailed description, the accompanying drawings and the appended claims.

DETAILED DESCRIPTION

Figure 1:
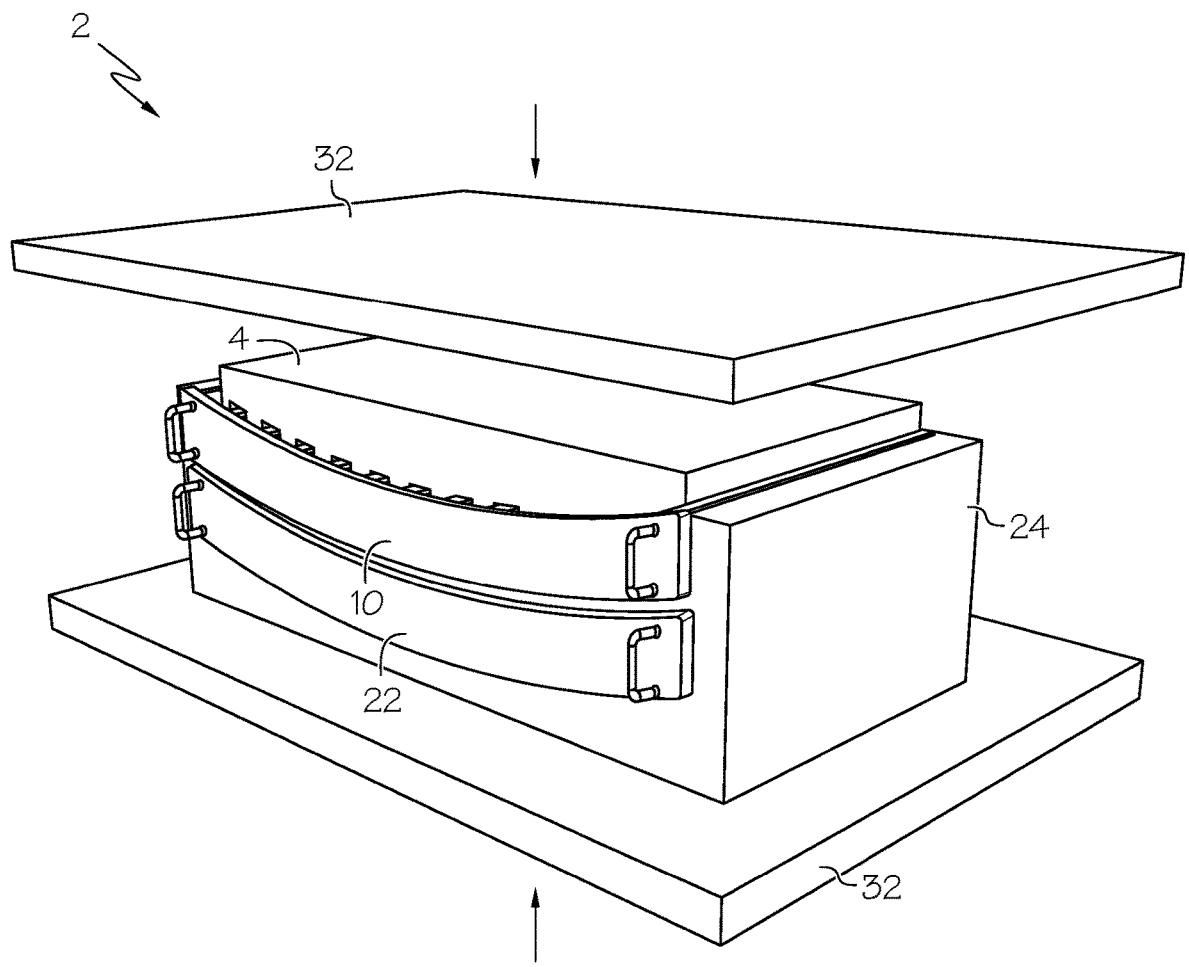
FIG. 1 is a perspective view of an induction heating system in an assembled condition disposed between press platens.
Figure 2:
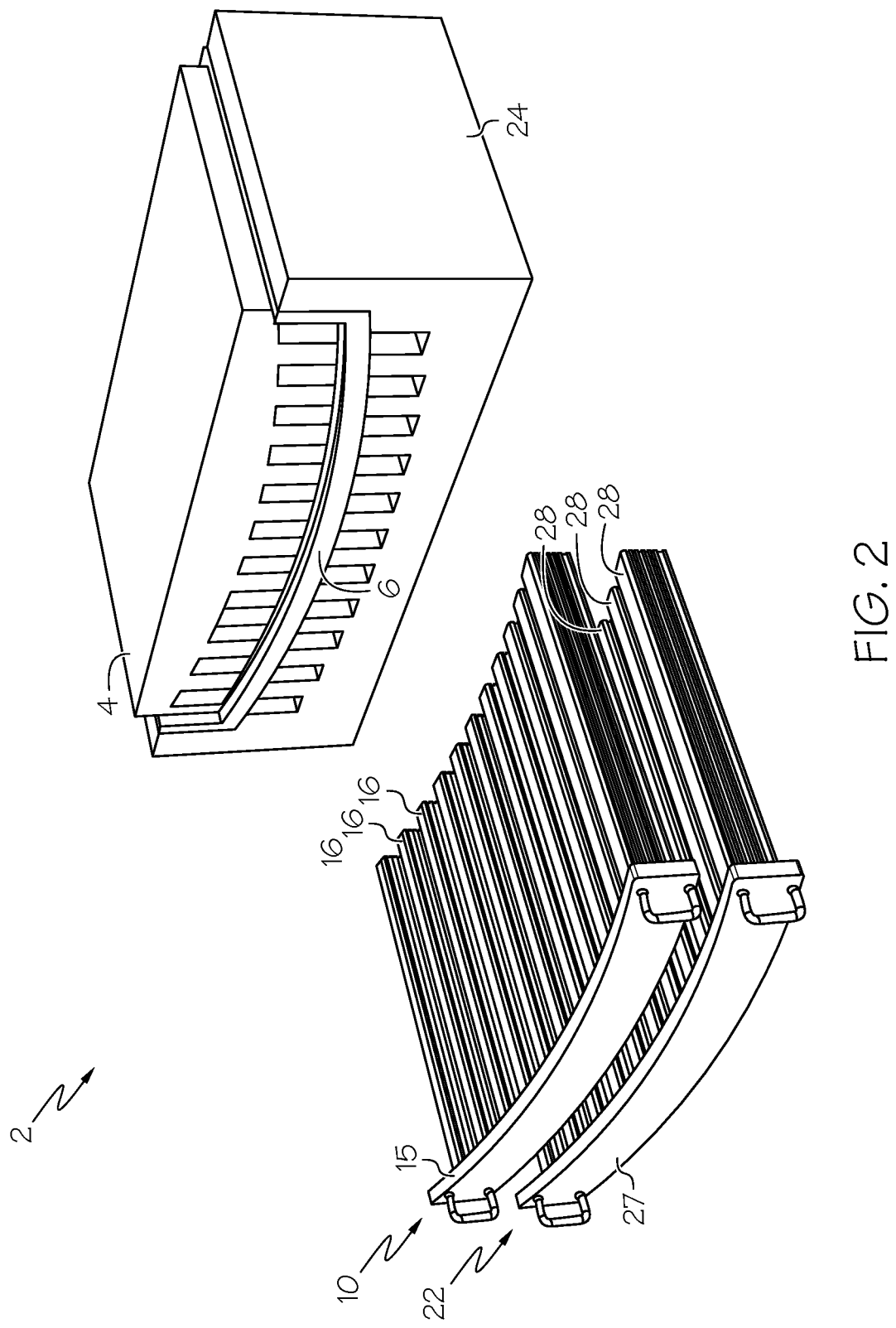
FIG. 2 is a perspective view of the induction heating system of FIG. 1 further showing removed armature-supported induction coil arrays.
Figure 3:
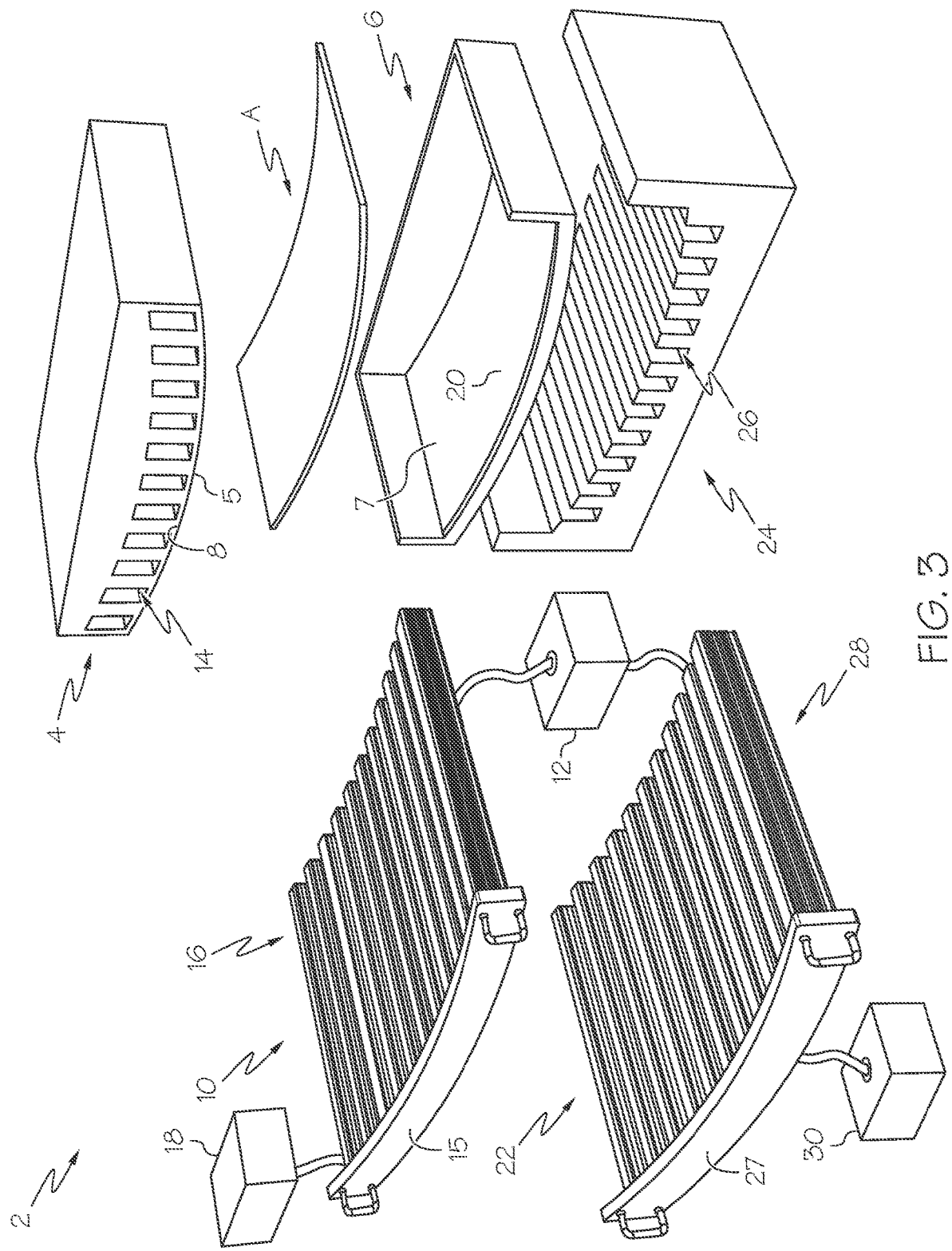
FIG. 3 is an exploded perspective view of the induction heating system of FIG. 1 further showing metallic susceptors that are part of molds of the induction heating system.
Figure 4:
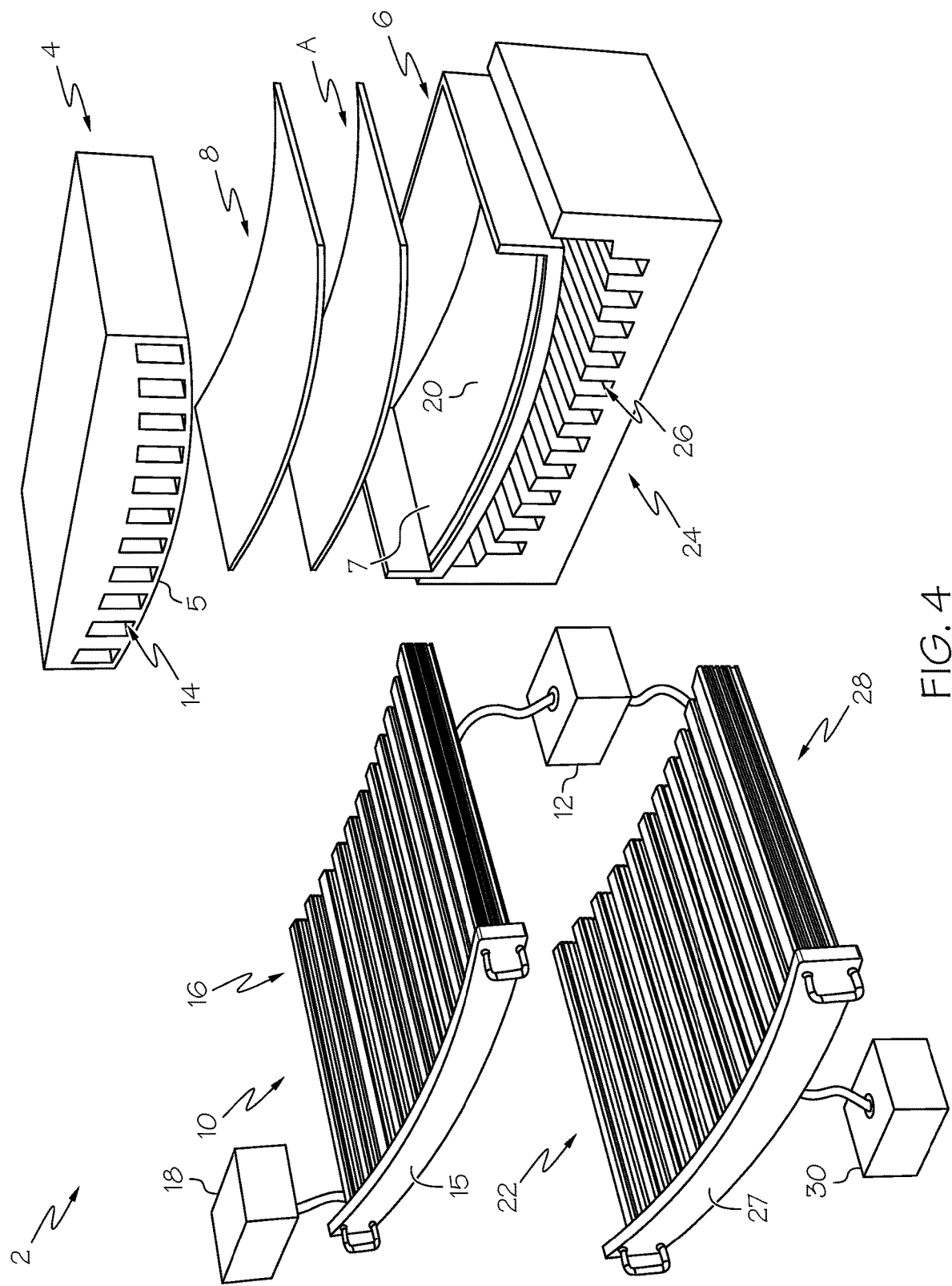
FIG. 4 is an exploded perspective view of a variation of induction heating system of FIG. 3 further showing metallic susceptors that are adjacent to the molds of the induction heating system.
Figure 5:
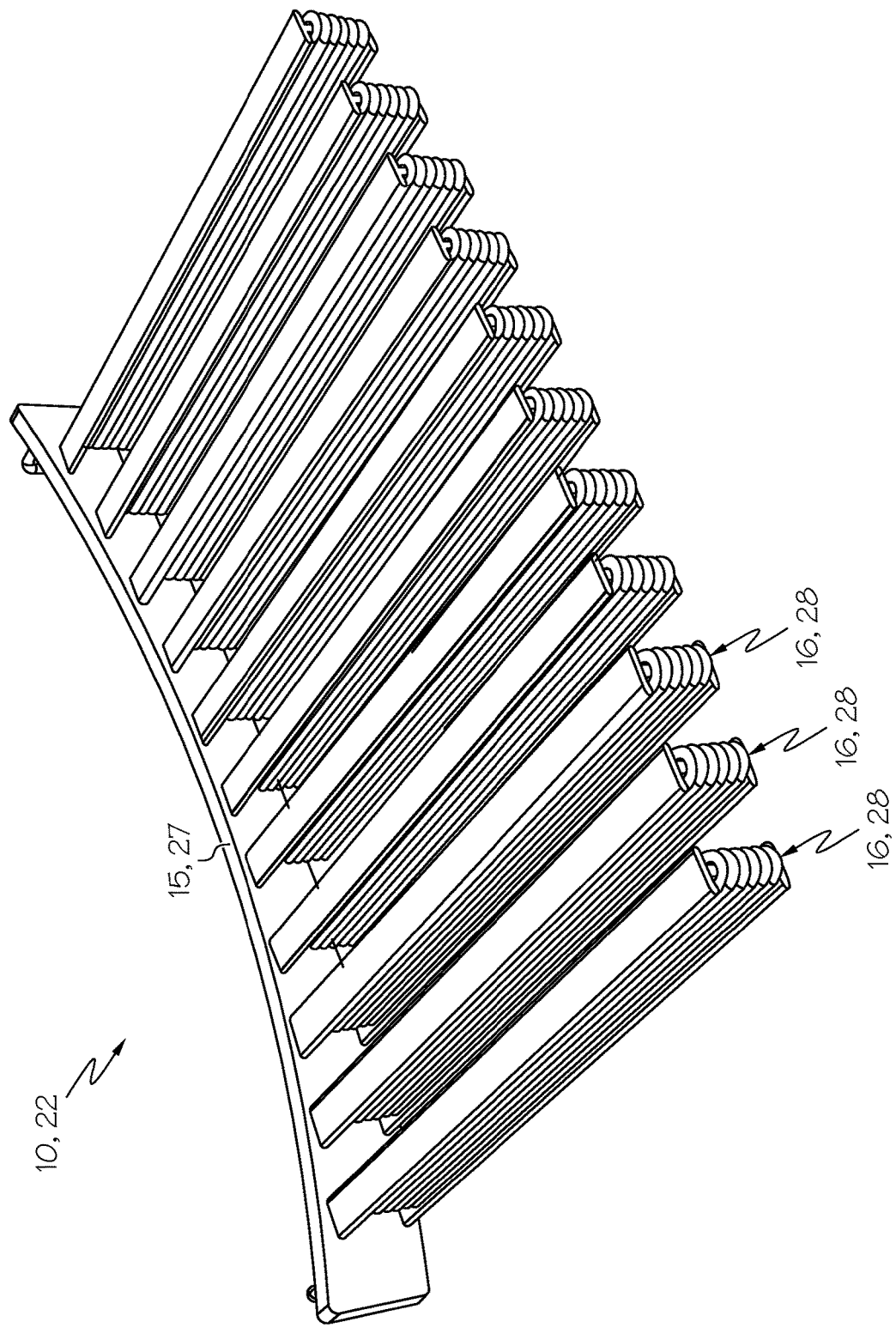
FIG. 5 is a first perspective view of an armature-supported induction coil array.
Figure 6:
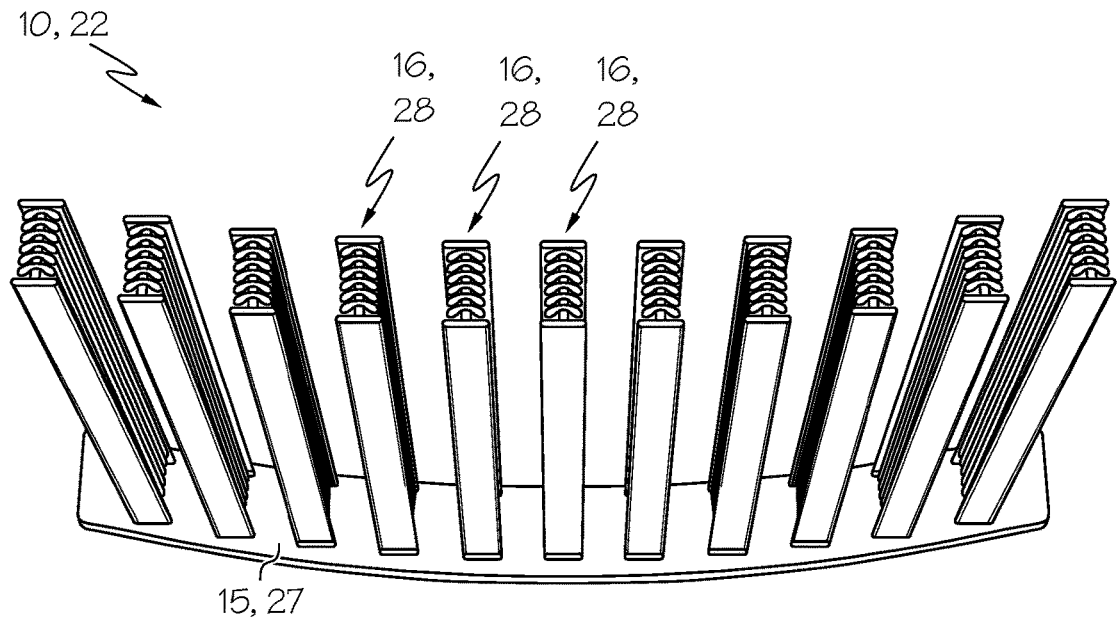
FIG. 6 is a second perspective view of the armature-supported induction coil array of FIG. 5.
Figure 7:
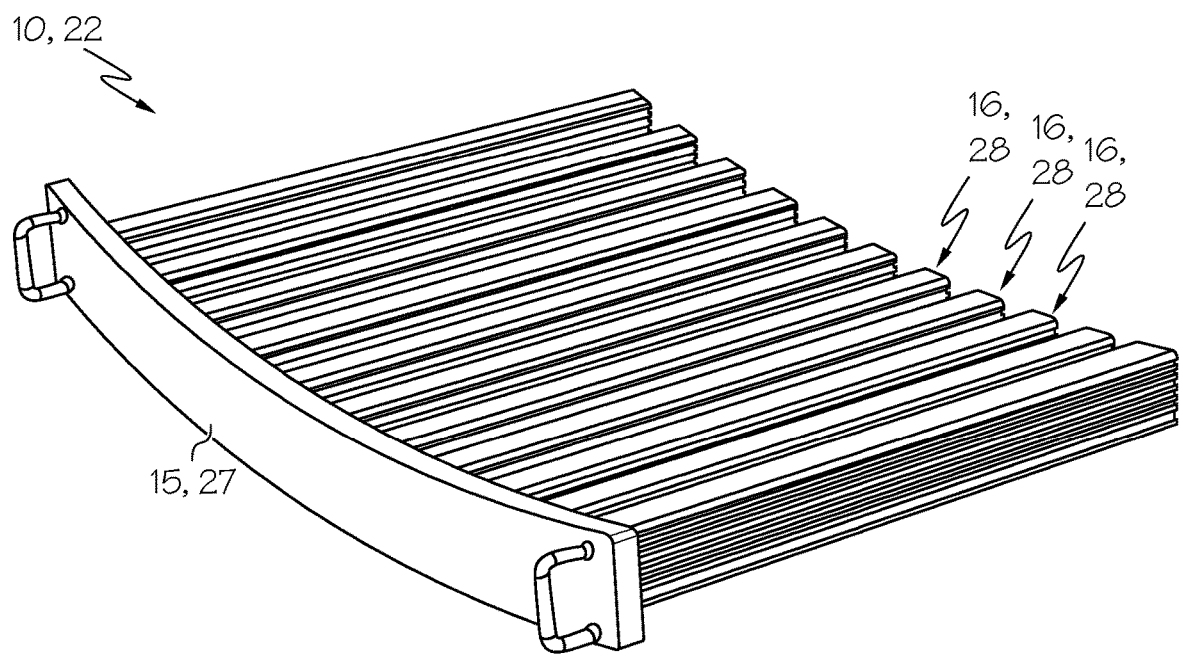
FIG. 7 is a third perspective view of the armature-supported induction coil array of FIG. 5.
Figure 8:
FIG. 8 is a side view of a finger of the armature-supported induction coil array.
Figure 9:
FIG. 9 is a first perspective view of the finger of FIG. 8.
Figure 10:
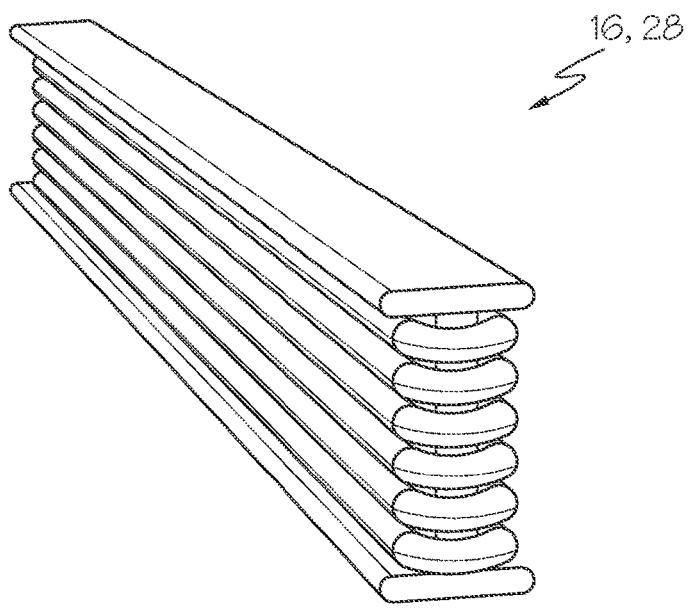
FIG. 10 is a second perspective view of the finger of FIG. 8.

FIG. 1 is a perspective view of an induction heating system in an assembled condition disposed between press platens. FIG. 2 is a perspective view of the induction heating system of FIG. 1 further showing removed armature-supported induction coil arrays. FIG. 3 is an exploded perspective view of the induction heating system of FIG. 1 further showing metallic susceptors that are part of molds of the induction heating system. FIG. 4 is an exploded perspective view of a variation of induction heating system of FIG. 3 further showing metallic susceptors that are adjacent to the molds of the induction heating system. FIG. 5 is a first perspective view of an armature-supported induction coil array. FIG. 6 is a second perspective view of the armature-supported induction coil array of FIG. 5. FIG. 7 is a third perspective view of the armature-supported induction coil array of FIG. 5. FIG. 8 is a side view of a finger of the armature-supported induction coil array. FIG. 9 is a first perspective view of the finger of FIG. 8. FIG. 10 is a second perspective view of the finger of FIG. 8.

Referring to FIGS. 1 to 3, there is an induction heating system 2. The induction heating system 2 includes a first mold 4 and a second mold 6 defining a mold cavity therebetween, a first metallic susceptor 8 as part of the first mold 4, a first armature-supported induction coil array 10 in proximity to the first metallic susceptor 8, and a first induction generator 12 electrically coupled with the first armature-supported induction coil array 10. FIG. 4 is a variation of FIG. 3 in which the first metallic susceptor 8 is adjacent to the first mold 4. By providing these combinations of features, regardless of whether the first metallic susceptor 8 is as part of or adjacent to the first mold 4, the induction heating system 2 facilitates use of the induction heating system 2 to heat and mold a thermoplastic article A.

Although the first mold 4 and second mold 6 are illustrated as providing a simple-shaped mold cavity therebetween, the present description facilitates molding of complex contoured articles.

Referring to FIGS. 1 to 3, the first mold 4 includes a plurality of first slots 14. Referring to FIGS. 5 to 10, the first armature-supported induction coil array 10 is shown as a modular induction coil comprising a plurality of first fingers 16 positionable within the plurality of first slots 14. Accordingly, by providing the plurality of first slots 14 in the first mold 4 and the plurality of first fingers 16 in the first armature-supported induction coil array 10, the induction heating system 2 facilitates removal of the first armature-supported induction coil array 10 from the first mold 4. In an aspect, the first armature-supported induction coil array 10 may include an endcap 15 supporting the plurality of first fingers 16.

By removing the first armature-supported induction coil array 10 from the first mold 4, the induction heating system 2 facilitates air cooling, e.g. passive air cooling, of the thermoplastic article A and the first armature-supported induction coil array 10. Also, the separated finger structure of the first armature-supported induction coil array 10 facilitates faster air cooling by permitting convection of area between each of the plurality of first fingers 16.

Additionally, by providing a removable first armature-supported induction coil array 10, the first armature-supported induction coil array 10 can be removed and placed into another tool as needed. This modularity reduced the total cost and complexity of the molding tool. Additionally, by making the first armature-supported induction coil array 10 as a plurality first fingers 16, the first armature-supported induction coil array 10 can be shaped to best approximate the contour of the lowermost surface 5 of the first mold 4 for more efficient inductive coupling.

Referring to FIGS. 1 to 3, the induction heating system 2 includes a first magnetic hysteresis detector 18 associated with the first armature-supported induction coil array 10. By providing the first magnetic hysteresis detector 18, a magnetic hysteresis from the inductively heated first metallic susceptor 8 can be detected. By detecting a magnetic hysteresis from the inductively heated first metallic susceptor 8, a frequency generated by the first induction generator 12 can be adjusted to minimize heating of the first armature-supported induction coil array 10. The adjustment of the frequency generated by the first induction generator 12 may frequency match the magnetic hysteresis from the inductively heated first metallic susceptor 8. Heating the first metallic susceptor 8 by this frequency matching induction generation can minimize heat generated in the first armature-supported induction coil array 10. The adjustment of the frequency generated by the first induction generator 12 may be performed, for example, by using a controller (not shown), which may be computer hardware device. The controller may be communicatively coupled to the first magnetic hysteresis detector 18 and the first induction generator 12.

By minimizing heating of the first armature-supported induction coil array 10, water cooling of the first armature-supported induction coil array 10 can be avoided.

The above-described feature of the first magnetic hysteresis detector 18 may be employed in combination with the first armature-supported induction coil array 10 having the plurality of first fingers 16.

Referring to FIGS. 1 to 3, the induction heating system 2 includes a second metallic susceptor 20 as part of the second mold 6. FIG. 4 is a variation of FIG. 3 in which the second metallic susceptor 20 is adjacent to the second mold 6. By providing the second metallic susceptor 20, regardless of whether the second metallic susceptor 20 is as part of or adjacent to the second mold 6, the induction heating system 2 facilitates use of the induction heating system 2 to heat the thermoplastic article A from both sides of the thermoplastic article A. In another variation, the first metallic susceptor 8 is part of the first mold 4 while the second metallic susceptor 20 is adjacent to the second mold 6. In yet another variation, the first metallic susceptor 8 is adjacent to the first mold 4 while the second metallic susceptor 20 is part of the second mold 6.

The above-described feature of second metallic susceptor may be employed in combination with the first armature-supported induction coil array 10 having the plurality of first fingers 16.

Referring to FIGS. 1 to 3, the induction heating system 2 includes a second armature-supported induction coil array 22 shown as a modular induction coil in proximity to the second metallic susceptor 20. By providing the second armature-supported induction coil array 22, a heating of the second metallic susceptor 20 by the second armature-supported induction coil array 22 may be independently controlled from the heating of the first metallic susceptor 8 by the first armature-supported induction coil array 10.

In the illustrated embodiment of the present description, the first induction generator 12 is shown to be electrically coupled with the second armature-supported induction coil array 22. In a variation, the induction heating system 2 may include a second induction generator (not shown) and the second induction generator may be electrically coupled with the second armature-supported induction coil array 22.

Referring to FIGS. 1 to 3, the induction heating system 2 includes a mold support 24 supporting the second mold 6. By providing the mold support 24, the second mold 6 may have a small overall size. In a variation, the mold support 24 may instead support the first mold 4. In another variation, there may be two mold supports, each mold support supporting one of the first mold 4 and second mold 6. In yet another variation, there may be no mold supports, and the second mold 6 may be substantially similar to the first mold 4.

Referring to FIGS. 1 to 3, the mold support 24 includes a plurality of second slots 26. Referring to FIGS. 5 to 10, the second armature-supported induction coil array 22 includes a plurality of second fingers 28 positionable within the plurality of second slots 26. Accordingly, by providing the plurality of second slots 26 in the mold support 24 and the plurality of second fingers 28 in the second armature-supported induction coil array 22, the induction heating system 2 facilitates removal of the second armature-supported induction coil array 22 from the mold support 24. In an aspect, the armature-supported induction coil array 22 may include a second endcap 27 supporting the plurality of second fingers 28.

By removing the second armature-supported induction coil array 22 from the mold support 24, the induction heating system 2 facilitates air cooling, e.g. passive air cooling, of the thermoplastic article A and the second armature-supported induction coil array 22. Also, the separated finger structure of the second armature-supported induction coil array 22 facilitates faster air cooling by permitting convection of area between each of the plurality of second fingers 28.

Additionally, by providing a removable second armature-supported induction coil array 22, the second armature-supported induction coil array 22 can be removed and placed into another tool as needed. This modularity reduced the total cost and complexity of the molding tool. Furthermore, by making the second armature-supported induction coil array 22 as a plurality second fingers 28, the second armature-supported induction coil array 22 can be shaped to best approximate the contour of the uppermost surface 7 of the second mold 6 for more efficient inductive coupling.

As explained previously, variations include that the mold support 24 instead supports the first mold 4, that there may be two mold supports 24, each mold support 24 supporting one of the first mold 4 and second mold 6, and that may be no mold supports 24, and the second mold 6 may be substantially similar to the first mold 4. In the case of the presence of mold supports 24 for the first mold 4 and/or the second mold 6, the present description includes that possibility that one of the mold supports 24 may include the plurality of first slots 14 and such that the first armature-supported induction coil array 10 includes a plurality of first fingers 16 positionable within the plurality of first slots 14, and that the other of the mold supports 24 may include the plurality of second slots 26 and such that the second armature-supported induction coil array 22 includes a plurality of second fingers 28 positionable within the plurality of second slots 26.

Referring to FIGS. 1 to 3, the induction heating system 2 includes a second magnetic hysteresis detector 30 associated with the second armature-supported induction coil array 22. By providing the second magnetic hysteresis detector 30, a magnetic hysteresis from the inductively heated second metallic susceptor 20 can be detected. By detecting a magnetic hysteresis from the inductively heated second metallic susceptor 20, a frequency generated by the first induction generator 12 can be adjusted to minimize heating of the second armature-supported induction coil array 22. The adjustment of the frequency generated by the first induction generator 12 may frequency match the magnetic hysteresis from the inductively heated second metallic susceptor 20. Heating the second metallic susceptor 20 by this frequency matching induction generation can minimize heat generated in the second armature-supported induction coil array 22. The adjustment of the frequency generated by the first induction generator 12 may be performed, for example, by using a controller (not shown), which may be computer hardware device. The controller may be communicatively coupled to the second magnetic hysteresis detector 30 and the first induction generator 12. By minimizing heating of the second armature-supported induction coil array 22, water cooling of the second armature-supported induction coil array 22 can be avoided.

In the illustrated embodiment of the present description, the first induction generator 12 is shown to be electrically coupled with the second armature-supported induction coil array 22. In a variation, the induction heating system 2 may include a second induction generator (not shown) and the second induction generator may be electrically coupled with the second armature-supported induction coil array 22. Thus, by detecting a magnetic hysteresis from the inductively heated second metallic susceptor 20, a frequency generated by the second induction generator can be adjusted to minimize heating of the second armature-supported induction coil array 22.

The above-described feature of the second magnetic hysteresis detector 30 may be employed in combination with any one or more of the features of the induction heating system 2 described above.

Referring to FIG. 1, the induction heating system 2 includes a press platen 32 for pressing together the first mold 4 and the mold support 24 supporting the second mold 6 (not shown in FIG. 1). The illustrated press platen 32 is merely a representative illustration. It will be understood that any press platen 32 may be employed for pressing together the first mold 4 and the second mold 6, whether or not one or both of the first mold 4 and the second mold 6 are supported by mold supports 24. By providing the press platen 32, the induction heating system 2 facilitates consolidation of the thermoplastic article A during a process of molding the thermoplastic article A.

The above-described feature of the press platen 32 may be employed in combination with any one or more of the features of the induction heating system 2 described above.

Referring to FIG. 3, in an example, at least a portion of the first mold 4 forms the first metallic susceptor 8. In the illustrated embodiment, the lowermost surface 5 of the first mold 4 forms the first metallic susceptor 8. By providing the first metallic susceptor 8 as at least a portion of the first mold 4, a process of assembling the induction heating system 2 for molding the thermoplastic article A may be simplified.

Referring to FIG. 4, in an example, the first metallic susceptor 8 is positioned adjacent to the first mold 4. By providing the first metallic susceptor 8 as being positioned adjacent to the first mold 4, a process of making the first mold 4 and first metallic susceptor 8 may be simplified. Additionally, the first mold 4 may be made entirely of non-conductive materials.

Referring to FIG. 3, in an example, at least a portion of the second mold 6 forms the second metallic susceptor 20. In the illustrated embodiment, the uppermost surface 7 of the second mold 6 forms the second metallic susceptor 20. By providing the second metallic susceptor 20 as at least a portion of the second mold 6, a process of assembling the induction heating system 2 for molding the thermoplastic article A may be simplified.

Referring to FIG. 4, in an example, the second metallic susceptor 20 is positioned adjacent to the second mold 6. By providing the second metallic susceptor 20 as being positioned adjacent to the second mold 6, a process of making the second mold 6 and second metallic susceptor 20 may be simplified. Additionally, the second mold 6 may be made entirely of non-conductive materials.

A variation of the induction heating system 2 includes that at least a portion of the first mold 4 forms the first metallic susceptor 8 while at least a portion of the second mold 6 forms the second metallic susceptor 20. Another variation of the induction heating system 2 includes that at least a portion of the first mold 4 forms the first metallic susceptor 8 while the second metallic susceptor 20 is positioned adjacent to the second mold 6. Yet another variation of the induction heating system 2 includes that the first metallic susceptor 8 is positioned adjacent to the first mold 4 while at least a portion of the second mold 6 forms the second metallic susceptor 20. Yet another variation of the induction heating system 2 includes that the first metallic susceptor 8 is positioned adjacent to the first mold 4 while the second metallic susceptor 20 is positioned adjacent to the second mold 6.

The above-described features of the first metallic susceptor 8 and the second metal susceptor 20, according to any of the variations, may be employed in combination with any one or more of the features of the induction heating system 2 described above.

In an aspect, the first metallic susceptor 8 is formed from a smart susceptor material. In another aspect, the second metallic susceptor 20 is formed from a smart susceptor material. In yet another aspect, both the first metallic susceptor 8 and the second metallic susceptor 20 are formed from smart susceptor materials.

A smart susceptor material is a material having a predetermined Curie point causing a reduction of magnetic properties of the material as the material nears the Curie point. Thus, the smart susceptor material facilitates a limiting temperature to which the material may be inductively heated. By way of example, the smart susceptor material of the first metallic susceptor 8 and the second metallic susceptor 20 includes nickel-iron alloys.

By providing the first metallic susceptor 8 and/or the second metallic susceptor 20 as a smart susceptor material, the temperature to which the first metallic susceptor 8 and/or the second metallic susceptor 20 may be heated is limited, thereby preventing overheating of the thermoplastic article A.

The above-described smart susceptor materials of the first metallic susceptor 8 and the second metal susceptor 20, according to any of the variations, may be employed in combination with any one or more of the features of the induction heating system 2 described above.

Figure 11:
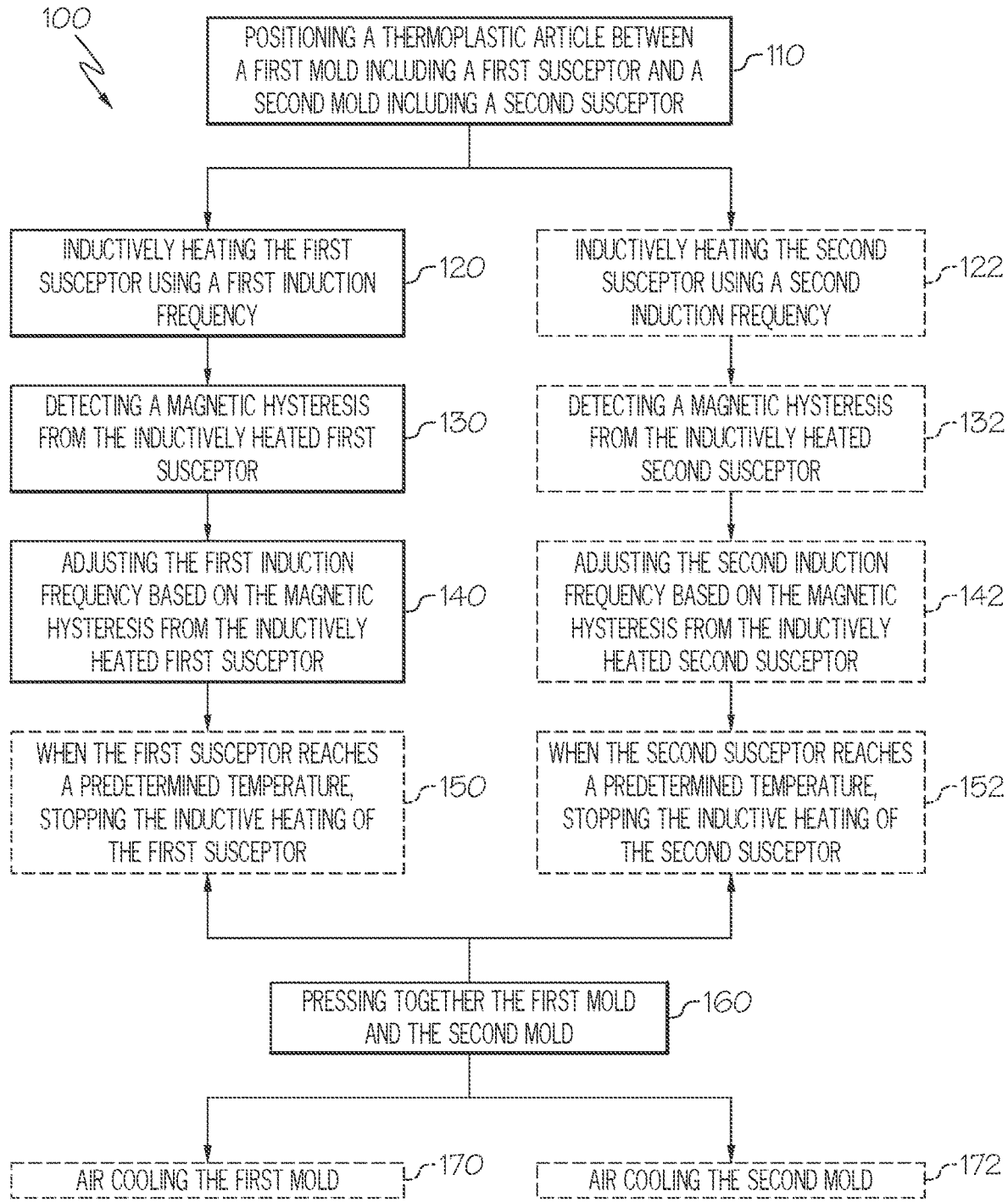
FIG. 11 is a flow diagram representing a method for molding a thermoplastic article.

FIG. 11 is a flow diagram representing a method 100 for molding a thermoplastic article A, such as a thermoplastic composite article. The method 100 includes positioning 110 a thermoplastic article A between a first mold 4 including a first metallic susceptor 8 and a second mold 6 including a second metallic susceptor 20, inductively heating 120 the first metallic susceptor 8 using a first induction frequency, detecting a magnetic hysteresis 130 from the inductively heated first metallic susceptor 8, adjusting the first induction frequency 140 based on the magnetic hysteresis from the inductively heated first metallic susceptor 8, and pressing together 160 the first mold 4 and the second mold 6. FIG. 11 further includes optional steps shown in dashed lines.

By this the method 100, the steps of positioning, inductively heating, and pressing of the thermoplastic article A between the first mold 4 and the second mold 6 effectuate the process of molding of the thermoplastic article A while the steps of detecting the magnetic hysteresis and adjusting the first induction frequency avoid the need for water cooling of the first mold 4.

The above-described method 100 may be employed in combination with any of the features of the induction heating system 2 as described above.

Referring to FIG. 11, the method 100 includes, when the first metallic susceptor 8 reaches a predetermined temperature, stopping the inductive heating 150 of the first metallic susceptor 8. By way of example, the stopping of the inductive heating 150 of the first metallic susceptor 8 may be facilitated by forming the first metallic susceptor 8 from a smart susceptor material. By stopping the inductive heating 150 of the first metallic susceptor 8, the temperature to which the first metallic susceptor 8 may be heated is limited, thereby preventing overheating of the thermoplastic article A. In an example, the predetermined temperature at which the inductive heating of the first metallic susceptor 8 is stopped is above a curing temperature of the thermoplastic article A.

The step of stopping the inductive heating 150 of the first metallic susceptor 8 may be employed in combination with any of the features of the induction heating system 2 as described above.

Referring to FIG. 11, the method 100 includes, air cooling 170 the first mold 4. By way of example, air cooling 170 of the first mold 4 may be facilitated by providing a first armature-supported induction coil array 10, which is removable from the first mold 4. By removing the first armature-supported induction coil array 10 from the first mold 4, the first armature-supported induction coil array 10 can be easily air cooled in the ambient air surrounding the removed first armature-supported induction coil array 10. In addition to facilitating the air cooling of the first mold 4, air cooling of the thermoplastic article A and the first armature-supported induction coil array 10 may be facilitated.

The step of air cooling 170 the first mold 4 may be employed in combination with the step of stopping the inductive heating 150 of the first metallic susceptor 8 and may be combined with any of the features of the induction heating system 2 as described above.

Referring to FIG. 11, the method 100 includes, inductively heating 122 the second metallic susceptor 20 using a second induction frequency, detecting a magnetic hysteresis 132 from the inductively heated second metallic susceptor 20, and adjusting the second induction frequency 142 based on the magnetic hysteresis from the inductively heated second metallic susceptor 20. By providing the steps, the method 100 facilitates heating the thermoplastic article A from both sides of the thermoplastic article A and avoids the need for water cooling of the second mold 6.

These steps of inductively heating 122 the second metallic susceptor 20 using a second induction frequency, detecting a magnetic hysteresis 132 from the inductively heated second metallic susceptor 20, and adjusting the second induction frequency 142 based on the magnetic hysteresis from the inductively heated second metallic susceptor 20 may be employed in combination with the step of stopping the inductive heating 150 of the first metallic susceptor 8 and/or with air cooling 170 the first mold 4 and may further be combined with any of the features of the induction heating system 2 as described above.

Referring to FIG. 11, the method 100 includes, when the second metallic susceptor 20 reaches a predetermined temperature, stopping the inductive heating 152 of the second metallic susceptor 20. By way of example, the stopping of the inductive heating 152 of the second metallic susceptor 20 may be facilitated by forming the second metallic susceptor 20 from a smart susceptor material. By stopping the inductive heating 152 of the second metallic susceptor 20, the temperature to which the second metallic susceptor 20 may be heated is limited, thereby preventing overheating of the thermoplastic article A. In an example, the predetermined temperature at which the inductive heating of the first metallic susceptor 8 is stopped is above a curing temperature of the thermoplastic article A.

The step of stopping the inductive heating 152 of the second metallic susceptor 20 may be employed in combination with any of the previously-describes steps of the method 100 and with any of the features of the induction heating system 2 as described above.

Referring to FIG. 11, the method 100 includes, air cooling 172 the second mold 6. By way of example, air cooling 172 of the second mold 6 may be facilitated by providing a second armature-supported induction coil array 22, which is removable from the second mold 6. By removing the second armature-supported induction coil array 22 from the second mold 6, the second armature-supported induction coil array 22 can be easily air cooled in the ambient air surrounding the removed second armature-supported induction coil array 22. In addition to facilitating the air cooling of the second mold 6, air cooling of the thermoplastic article A and the second armature-supported induction coil array 22 may be facilitated.

The step of air cooling 172 the second mold 6 may be employed in combination with any of the previously-describes steps of the method 100 and with any of the features of the induction heating system 2 as described above.

Figure 12:
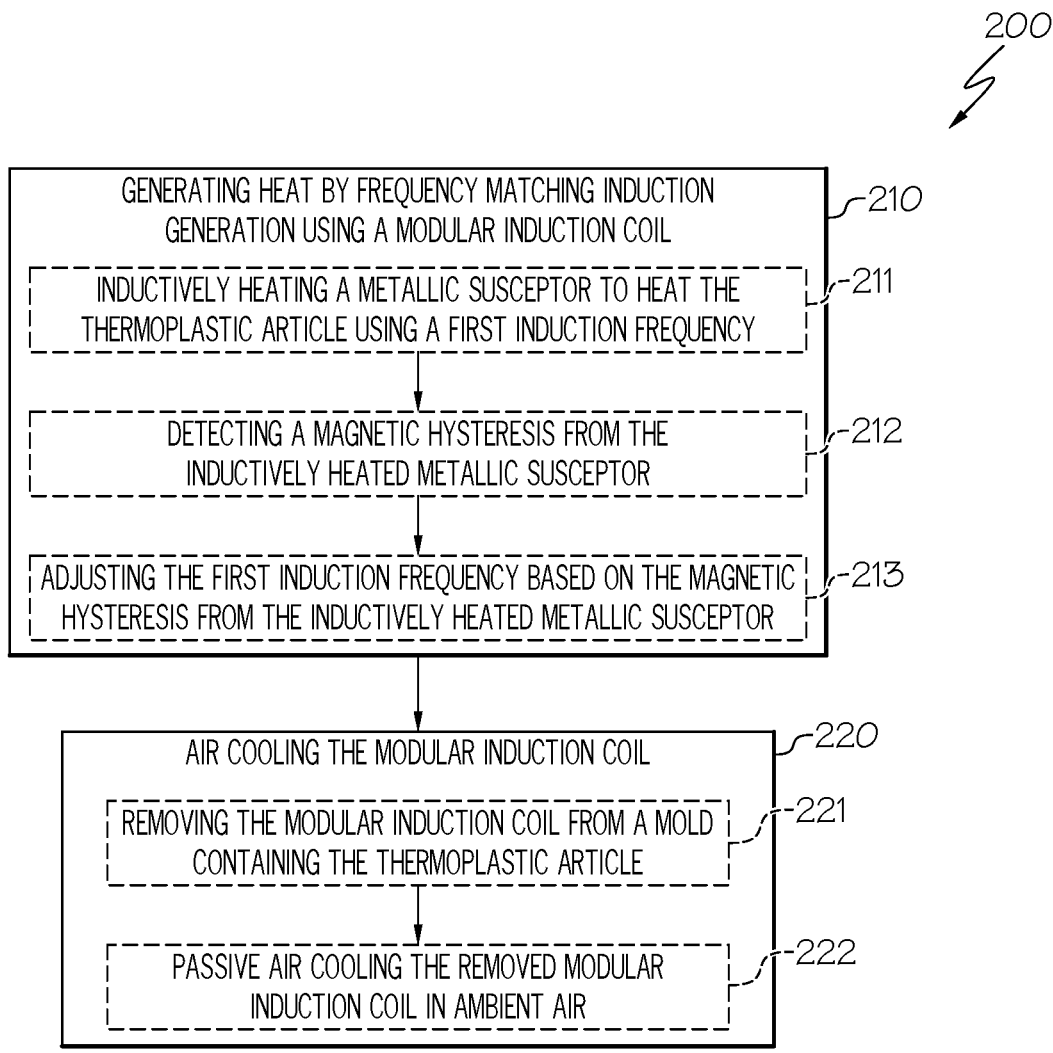
FIG. 12 is a flow diagram representing a method for processing a thermoplastic article.

FIG. 12 is a flow diagram representing a method 200 for processing a thermoplastic article 200, such as a thermoplastic composite article. The method includes generating 210 heat by frequency matching induction generation using a modular induction coil and air cooling 220 the modular induction coil. FIG. 12 further includes optional steps shown in dashed lines.

Referring to FIG. 12, the step of generating heat 210 by frequency matching induction generation using a modular induction coil includes inductively heating 211 a metallic susceptor to heat the thermoplastic article using a first induction frequency, detecting 212 a magnetic hysteresis from the inductively heated metallic susceptor, and adjusting 213 the first induction frequency based on the magnetic hysteresis from the inductively heated metallic susceptor.

Referring to FIG. 12, the step of air cooling 220 the modular induction coil includes removing 221 the modular induction coil from a mold containing the thermoplastic article, and passive air cooling 222 the removed modular induction coil in ambient air.

In an aspect, the modular induction coil may take the form of the first armature-supported induction coil array 10 or the second armature-supported induction coil array 22. In another aspect, the metallic susceptor may take the form of the first metallic susceptor 8 or the second metallic susceptor 20. In another aspect, detecting a magnetic hysteresis from the inductively heated metallic susceptor 212 may be performed by the first magnetic hysteresis detector 18 or the second magnetic hysteresis detector 30. In yet another aspect, adjusting the first induction frequency based on the magnetic hysteresis from the inductively heated metallic susceptor 213 may be performed using a controller (not shown), which may be computer hardware device.

Figure 13:
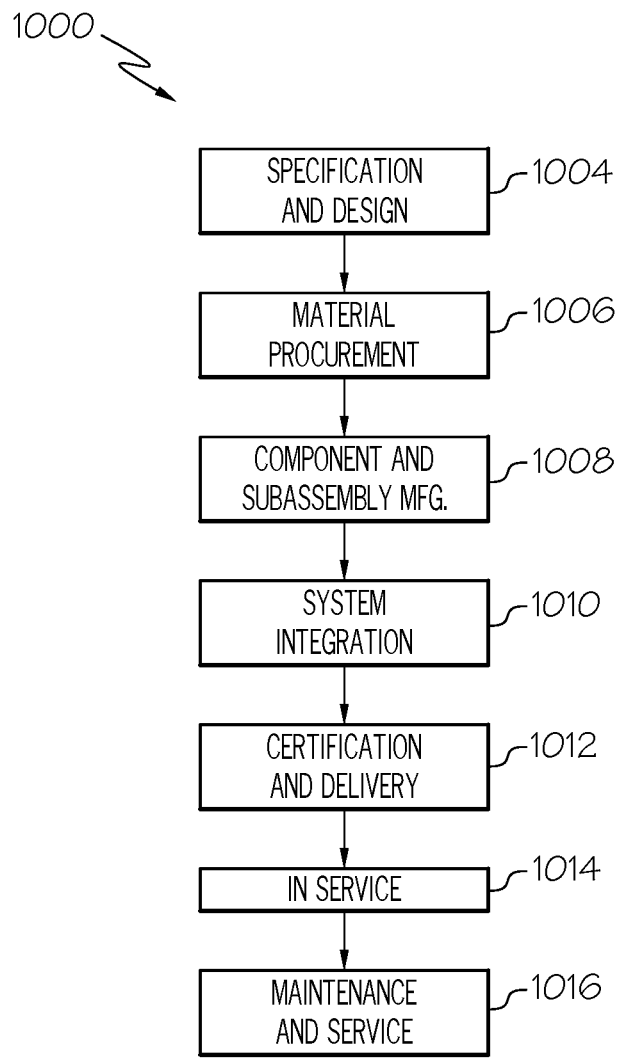
FIG. 13 is a flow diagram of an aircraft manufacturing and service methodology.
Figure 14:
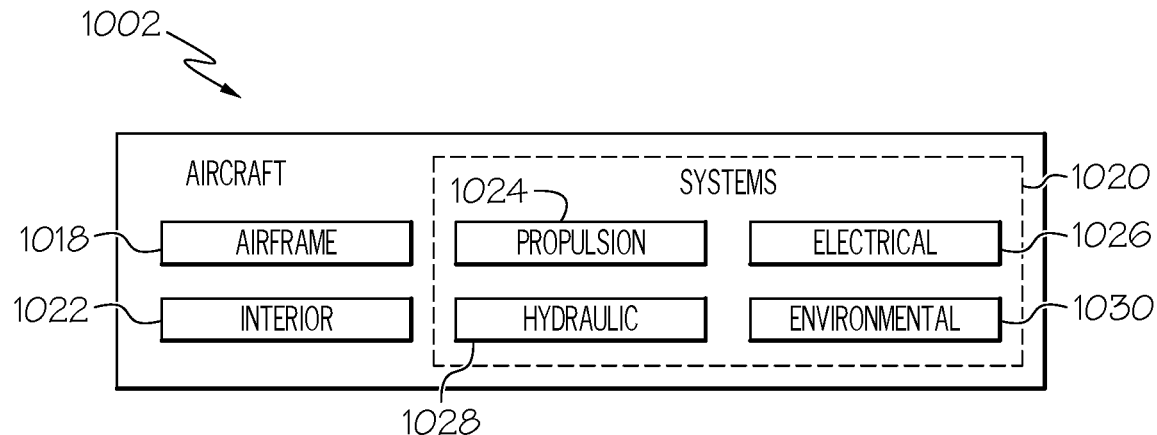
FIG. 14 is a block diagram of an aircraft.

Examples of the present disclosure may be described in the context of an aircraft manufacturing and service method 1000, as shown in FIG. 13, and an aircraft 1002, as shown in FIG. 14. During pre-production, the aircraft manufacturing and service method 1000 may include specification and design 1004 of the aircraft 1002 and material procurement 1006. During production, component/subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016, which may also include modification, reconfiguration, refurbishment and the like.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

The disclosed induction heating system and method for molding a thermoplastic article of the present disclosure may be employed during any one or more of the stages of the aircraft manufacturing and service method 1000, including at least component/subassembly manufacturing 1008, system integration 1010, and routine maintenance and service 1016.

As shown in FIG. 14, the aircraft 1002 produced by example method 1000 may include an airframe 1018 with a plurality of systems 1020 and an interior 1022. Examples of the plurality of systems 1020 may include one or more of a propulsion system 1024, an electrical system 1026, a hydraulic system 1028, and an environmental system 1030. Any number of other systems may be included. The disclosed induction heating system and method for molding a thermoplastic article of the present disclosure may be employed for any of the systems of the aircraft 1002, including at least airframe 1018 and interior 1022.

Although various embodiments of the disclosed induction heating system and method for molding a thermoplastic article have been shown and described, modifications may occur to those skilled in the art upon reading the specification. The present application includes such modifications and is limited only by the scope of the claims.

What is claimed is:

1. An induction heating system for molding a thermoplastic article, comprising:
    a first mold and a second mold defining a mold cavity therebetween for molding the thermoplastic article;
    a first metallic susceptor as part of or adjacent to the first mold;
    a first armature-supported induction coil array in proximity to the first metallic susceptor, wherein the first armature-supported induction coil array comprises a plurality of first fingers extending in a longitudinal direction, and wherein the first armature-supported induction coil array is configured to be slidably removed from the induction heating system in the longitudinal direction while the first mold and second mold are in a closed condition; and
    a first induction generator electrically coupled with the first armature-supported induction coil array.

2. The induction heating system of claim 1, wherein the first mold comprises a plurality of first slots and wherein the plurality of first fingers are positionable within the plurality of first slots.

3. The induction heating system of claim 1, further comprising a first magnetic hysteresis detector associated with the first armature-supported induction coil array.

4. The induction heating system of claim 1, further comprising a second metallic susceptor as part of or adjacent to the second mold.

5. The induction heating system of claim 4, further comprising a second armature-supported induction coil array in proximity to the second metallic susceptor.

6. The induction heating system of claim 5, further comprising a mold support supporting the second mold.

7. The induction heating system of claim 6, wherein the mold support comprises a plurality of second slots and the second armature-supported induction coil array comprises a plurality of second fingers positionable within the plurality of second slots.

8. The induction heating system of claim 7, further comprising a second magnetic hysteresis detector associated with the second armature-supported induction coil array.

9. The induction heating system of claim 4, wherein at least a portion of the second mold forms the second metallic susceptor.

10. The induction heating system of claim 4, wherein the second metallic susceptor is positioned adjacent to the second mold.

11. The induction heating system of claim 4, wherein the second metallic susceptor is formed from a smart susceptor material.

12. The induction heating system of claim 1, further comprising a press platen for pressing together the first mold and the second mold.

13. The induction heating system of claim 1, wherein at least a portion of the first mold forms the first metallic susceptor.

14. The induction heating system of claim 1, wherein the first metallic susceptor is positioned adjacent to the first mold.

15. The induction heating system of claim 1, wherein the first metallic susceptor is formed from a smart susceptor material.

16. A method for molding a thermoplastic article using the induction heating system of claim 1, the method comprising:
- positioning a thermoplastic article between the first mold and the second mold;
- inductively heating the first metallic susceptor using a first induction frequency;
- detecting a magnetic hysteresis from the inductively heated first metallic susceptor;
- adjusting the first induction frequency based on the magnetic hysteresis from the inductively heated first metallic susceptor; and
- pressing together the first mold and the second mold.

17. The method of claim 16 further comprising:
- when the first metallic susceptor reaches a predetermined temperature, stopping the inductive heating of the first metallic susceptor.

18. The method of claim 16 further comprising:
- air cooling the first mold.

19. The method of claim 16 further comprising:
- inductively heating a second metallic susceptor as part of or adjacent to the second mold using a second induction frequency;
- detecting a magnetic hysteresis from the inductively heated second metallic susceptor; and
- adjusting the second induction frequency based on the magnetic hysteresis from the inductively heated second metallic susceptor.

20. The method of claim 19 further comprising:
- when the second metallic susceptor reaches a predetermined temperature, stopping the inductive heating of the second metallic susceptor.

21. The method of claim 19 further comprising:
- air cooling the second mold.

22. A method for processing a thermoplastic article using the induction heating system of claim 1, the method comprising:
- inductively heating the first metallic susceptor by frequency matching induction generation using the first armature-supported induction coil array; and
- air cooling the first armature-supported induction coil array.

23. The method of claim 22 wherein inductively heating the first metallic susceptor by frequency matching induction generation using the first armature-supported induction coil array includes:
- inductively heating the first metallic susceptor to heat the thermoplastic article using a first induction frequency;
- detecting a magnetic hysteresis from the inductively heated first metallic susceptor; and
- adjusting the first induction frequency based on the magnetic hysteresis from the inductively heated first metallic susceptor.

24. The method of claim 22 wherein air cooling the first armature-supported induction coil array includes:
- removing the first armature-supported induction coil array from the first mold and the second mold containing the thermoplastic article; and
- passive air cooling the first armature-supported induction coil array in ambient air.

\* \* \* \* \*